United States Patent
Abe et al.

(10) Patent No.: US 9,064,364 B2
(45) Date of Patent: Jun. 23, 2015

(54) CONFIDENTIAL FRAUD DETECTION SYSTEM AND METHOD

(75) Inventors: Naoki Abe, Rye, NY (US); Carl E. Abrams, Briarcliff Manor, NY (US); Chidanand V. Apte, Chappaqua, NY (US); Bishwaranjan Bhattacharjee, Yorktown Heights, NY (US); Kenneth A. Goldman, Norwalk, CT (US); Matthias Gruetzner, Schocnaich (DE); Matthew A. Hilbert, Markham (CA); John Langford, Chicago, IL (US); Sriram K. Padmanabhan, Briarcliff Manor, NY (US); Charles P. Tresser, New York, NY (US); Kathleen M. Troidle, Dobbs Ferry, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2922 days.

(21) Appl. No.: 10/690,778

(22) Filed: Oct. 22, 2003

(65) Prior Publication Data

US 2005/0091524 A1    Apr. 28, 2005

(51) Int. Cl.
| | | |
|---|---|---|
| G06Q 20/02 | (2012.01) |
| G07F 7/10 | (2006.01) |
| G06F 21/62 | (2013.01) |
| G06F 21/72 | (2013.01) |
| G06Q 20/34 | (2012.01) |
| G07F 19/00 | (2006.01) |

(52) U.S. Cl.
CPC .......... *G07F 7/1008* (2013.01); *G06F 21/6245* (2013.01); *G06F 21/72* (2013.01); *G06F 2221/2101* (2013.01); *G06Q 20/341* (2013.01); *G07F 7/1083* (2013.01); *G07F 19/207* (2013.01)

(58) Field of Classification Search
USPC ............................................. 705/43; 709/213
See application file for complete search history.

(56) References Cited

U.S. PATENT DOCUMENTS

| | | | | |
|---|---|---|---|---|
| 6,240,415 | B1 * | 5/2001 | Blumberg ........................ 707/9 |
| 6,317,192 | B1 * | 11/2001 | Silverbrook et al. ........... 355/18 |
| 7,096,357 | B1 * | 8/2006 | Tochikubo et al. ........... 713/164 |
| 7,455,220 | B2 * | 11/2008 | Phillips et al. ................ 235/379 |
| 7,520,420 | B2 * | 4/2009 | Phillips et al. ................ 235/379 |
| 7,668,805 | B2 * | 2/2010 | Bird et al. ..................... 707/770 |
| 7,676,681 | B2 * | 3/2010 | Dillon et al. .................. 713/182 |
| 7,735,121 | B2 * | 6/2010 | Madani ............................. 726/6 |
| 7,831,896 | B2 * | 11/2010 | Amram et al. ................ 714/804 |

(Continued)

FOREIGN PATENT DOCUMENTS

WO      WO03052621 A1      6/2003

OTHER PUBLICATIONS

Zadrozny, B. et al., "A Simple Method for Cost-Sensitive Learning," IBM Research Report RC22666 (W0212-045), Dec. 6, 2002, pp. 1-11.

*Primary Examiner* — Evans J Augustin
(74) *Attorney, Agent, or Firm* — Douglas A. Lashmit; Hoffman Warnick LLC

(57) ABSTRACT

Various embodiments for maintaining security and confidentiality of data and operations within a fraud detection system. Each of these embodiments utilizes a secure architecture in which: (1) access to data is limited to only approved or authorized entities; (2) confidential details in received data can be readily identified and concealed; and (3) confidential details that have become non-confidential can be identified and exposed.

10 Claims, 3 Drawing Sheets

(56) References Cited

U.S. PATENT DOCUMENTS

| | | |
|---|---|---|
| 7,941,370 B2 * | 5/2011 | Paulsen et al. .................. 705/39 |
| 7,953,634 B2 * | 5/2011 | Cleary et al. .................... 705/16 |
| 7,958,353 B2 * | 6/2011 | Matsuzaki et al. ............ 713/170 |
| 7,959,069 B2 * | 6/2011 | Phillips et al. ................ 235/379 |
| 8,001,378 B2 * | 8/2011 | Rits ............................... 713/168 |
| 8,041,646 B2 * | 10/2011 | Bajan ............................. 705/64 |
| 8,185,443 B2 * | 5/2012 | Marcus ....................... 705/26.1 |
| 8,249,993 B2 * | 8/2012 | von Mueller .................. 705/75 |
| 8,271,391 B2 * | 9/2012 | Sauvebois ...................... 705/64 |
| 8,291,224 B2 * | 10/2012 | Pelton et al. .................. 713/175 |
| 8,370,643 B2 * | 2/2013 | Miyazaki et al. ............. 713/191 |
| 8,396,218 B2 * | 3/2013 | Miyazaki et al. ............. 380/259 |
| 8,406,422 B2 * | 3/2013 | Miyazaki et al. ............. 380/28 |
| 8,417,964 B2 * | 4/2013 | Miyazaki et al. ............. 713/189 |
| 8,452,985 B2 * | 5/2013 | Matsuzaki et al. ............ 713/191 |
| 8,688,969 B2 * | 4/2014 | Miyazaki et al. ............. 713/150 |
| 2002/0138417 A1 | 9/2002 | Lawrence |
| 2003/0033228 A1 | 2/2003 | Bosworth-Davies et al. |
| 2004/0044739 A1 * | 3/2004 | Ziegler ......................... 709/213 |
| 2004/0060042 A1 * | 3/2004 | Douceur et al. .............. 717/151 |

\* cited by examiner

CONFIDENTIAL FRAUD DETECTION SYSTEM AND METHOD

BACKGROUND OF THE INVENTION

1. Field of the Invention

The present invention generally relates generally to computer security, and more particularly relates to a confidential and secure architecture for implementing a fraud detection system and method.

2. Related Art

With the increase concern over global terrorism, fraud detection has become a critical tool in tracking and preventing criminal activities. In particular, Fraud Detection (FD) and Anti Money Laundering (AML) have been specifically identified under the Patriot Act as part of the anti-terrorist effort following the Sep. 11, 2001 tragedy. For the purposes of this disclosure the term "fraud detection" may include, e.g., check fraud, credit card fraud, debit card fraud, wire payment fraud, ATM fraud, fraud involving Automated Clearinghouse (ACH) transactions, as well as money laundering. Numerous fraud detection applications and techniques have been proposed, which make use of a range of approaches including fuzzy logic and artificial intelligence (e.g., machine learning, data mining, neural networks, etc.).

The key to the effective application of these techniques is a sufficiently large data set in order to be able to ensure a statistically significant sample size to minimize false positives. Thus, for instance, determining whether a significant money transfer is potentially fraudulent can generally be done with greater confidence when it is viewed in the context of a large set of transactions. To achieve a reasonable level of confidence, the data set may need to extend across an institution, and where possible outside the institution. It is this need to leverage as much data as possible that creates the challenge for financial institutions. Sharing data either between lines of business (LOBs) within an institution or among distinct institutions can present challenges. These challenges are particularly acute within financial institutions (FIs), in which:

(1) The data may be confidential and therefore critical to a firm's competitive positioning. Protecting the secrecy of such data against the competition, and as much as legally possible against any party, is therefore a priori incompatible with data sharing among various institutions; and (2) The data may be private, i.e., customer sensitive, and protecting the secrecy of the data is critical for the customers of the institution, who are sensitive to privacy. The need for privacy may also result from legislation, such as the Gramm-Leach-Bliley Financial Modernization Act.

Heretofore, attempts have been made to use a third party to collect such sensitive data. However, a problem connected with third party collection is directly linked to the lack of control of the third party. Specifically, the third party usually does not obtain all of the necessary data. Moreover, access to the data in these instances is often not controlled. Thus, confidential details are at risk of being exposed.

Thus, a solution is required in which institutions can share data in such a manner that the confidentiality and privacy can be maintained, while still allowing fraud detection applications to be run on the shared data.

SUMMARY OF THE INVENTION

The present invention addresses the above-mentioned problems, as well as others, by providing a secure architecture within which confidential data can be analyzed and or shared for the purposes of fraud detection. In a first aspect, the invention provides a system for detecting fraudulent transactions, comprising: an interface for inputting transaction data and outputting analysis results; and a secure data processing unit (SDPU) that provides a secret and tamperproof computing environment, wherein the SDPU includes: a security system that can restrict access to data and program execution; an analysis system for analyzing inputted transactions; a plurality of surveillance algorithms stored in an encrypted database; and a selection program for selecting at random times one or more different surveillance algorithms to be used by the analysis system.

A tamperproof computing environment, referred to also as tamper resistant, provides an environment where no secret is attainable by tampering. This is realized for instance by tamper sensing, where any attempted tampering is sensed; coupled with tamper reactivity such that all secrets get destroyed in the case of an attack; and tamper evidence, in which it is evident that a machine has reacted to an attack.

In a second aspect, the invention provides a method for detecting fraudulent transactions, comprising: providing an interface for inputting transaction data and receiving analysis results; providing a secure data processing unit (SDPU) that provides a secret and tamper-proof computing environment, wherein the SDPU can restrict access to data and program execution; providing a plurality of surveillance algorithms stored in an encrypted database; analyzing inputted transactions for fraud with a surveillance algorithm within the SDPU; and selecting at random times one or more different surveillance algorithms from the plurality of surveillance algorithms to analyze future inputted transactions.

In a third aspect, the invention provides a confederated fraud detection system, comprising: an interface for inputting transaction data; and a secure data processing unit (SDPU) that provides a secret and tamper-proof computing environment, wherein the SDPU includes: a security system that can restrict access to data and program execution; a consolidated database for storing encrypted data from a plurality of members; a consolidation system for securely importing encrypted data from each of the plurality of members; and at least one data analysis tool for analyzing the consolidated database.

In a fourth aspect, the invention provides a method for implementing a fraud detection service, comprising: providing a member based fraud detection service; securely transferring data to a confederated fraud detection system in which the data is maintained as confidential; storing the data in an encrypted form in a consolidated database along with data from other members; using the data in the consolidated database to facilitate fraud detection; and performing fraud detection on at least one transaction in a secure manner that is confidential with regard to the other members.

In a fifth aspect, the invention provides a distributed fraud detection system, comprising: a plurality of secure data processing units (SDPUs) distributed among a set of members, wherein each SDPU provides a secret and tamper-proof computing environment for the member, and wherein the SDPU includes: a secure database for storing member data; a security system that can restrict access to member data; and a secure communication system for securely transferring member data to and from each of the plurality of members in a secure and confidential manner.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
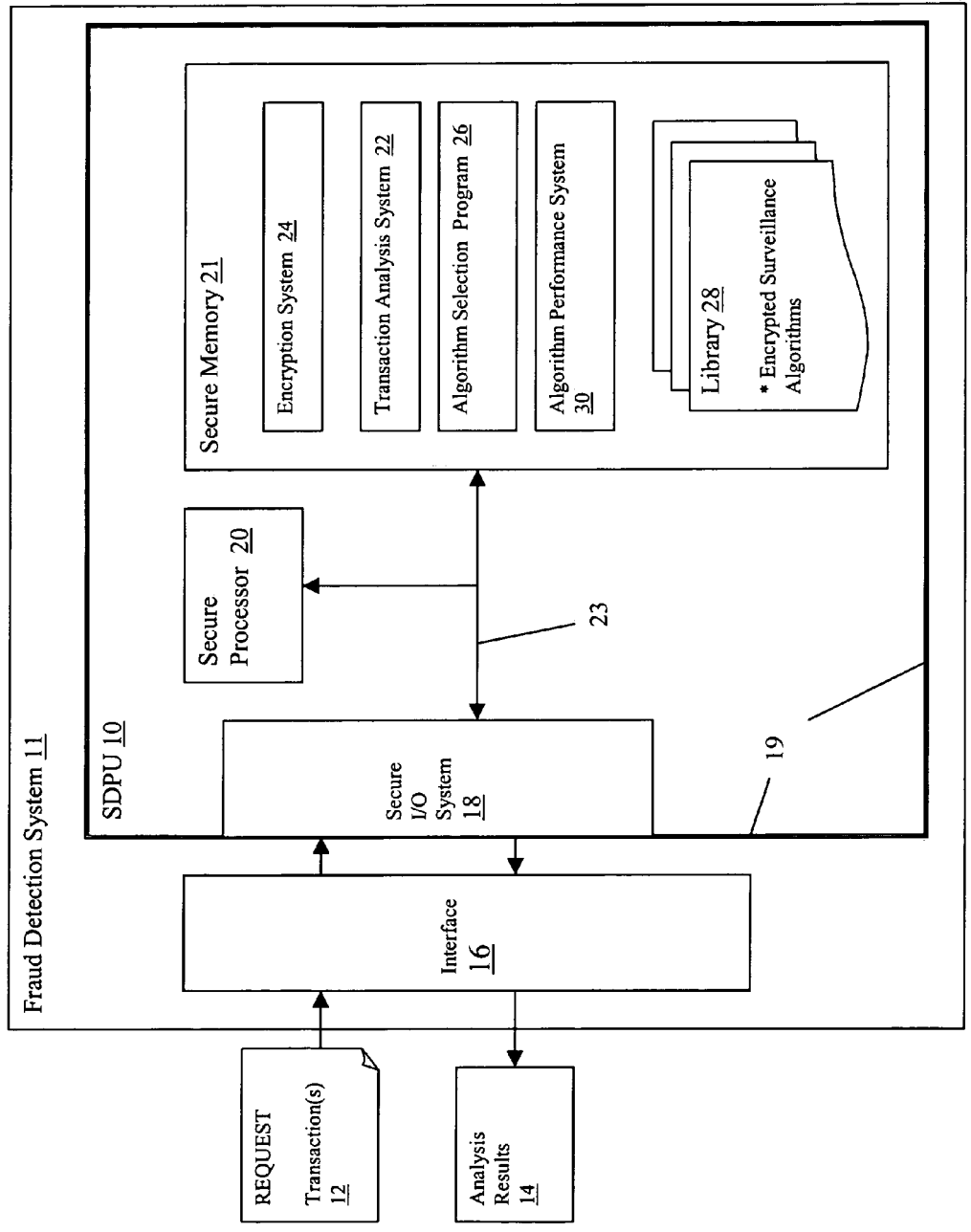
FIG. 1 depicts a fraud detection system in accordance with the present invention.

The present invention provides various embodiments for maintaining security and confidentiality of data and operations within a fraud detection system. Each of these embodiments utilizes a secure architecture in which: (1) access to data is limited to only approved or authorized entities; (2) confidential details in received data can be readily identified and concealed; and (3) confidential details that have become non-confidential can be identified and exposed.

Such a secure architecture may be implemented using a tamper resistant programmable hardware device, such as the IBM 4758 PCI Cryptographic Coprocessor, and known cryptography methodologies. An exemplary system for protecting confidential databases using such a device was disclosed in U.S. Pat. No. 7,370,366 filed on Nov. 16, 2001 entitled "DATA MANAGEMENT SYSTEM AND METHOD," by Lacan, Perez, Shub, and Tresser, which is hereby incorporated by reference.

Fraud Detection Methodologies

It is an objective of the present invention to provide a system and method to share data and allow queries and data analysis to be performed for the purpose of Fraud Detection (FD) on data sets in a manner that will preserve all commercially needed confidentiality. Fraud detection utilizes rules and/or algorithms to analyze transactions to determine if a transaction is potentially fraudulent. Typically, an FD system will comprise various operational units, such as:

(1) a database where data will be consolidated at the level of the unit that the system takes care of (e.g., a LOB, a branch, a national component, or the full firm). Data that is stored in the database may be gathered in real time or on a scheduled basis, and the data is typically cleansed and validated before being stored in the database.

(2) a model and profile resource (joined or separate), where the models and customer profiles get adapted when more data is gathered, when new regulations appear, and possibly when better theories and algorithms become available.

(3) a data cache to allow more efficient use of the two previous components, (4) a processing unit where the transaction and further data analysis is performed, (5) an application and communication layer where decisions are made to questions such as: "should alerts be sent?", "what should be the alerts to be sent?", "who should get the alerts?", "should some tags to attached to some accounts?", etc.

The task splitting between the two last units, and other similar dispatch of tasks between units, as well as the list and nomenclature of tasks to be performed may vary. More essential is the fact that the FD system must typically:

(1) monitor transactions, (2) use some set of rules and if possible improve this rule set, e.g., by learning or accepting new modules that encompass learning made elsewhere, (3) decide on how to classify some transactions, data and sets of data, and (4) act on the basis of these decisions, all with accountability and transparency, so as in particular to enable auditing.

There are two basic modes of operation for fraud detection, namely the batch mode training step, which performs data analysis on potentially large consolidated data to obtain fraud detection rules, and the real time detection step in which the rules are applied on specific instances to detect fraudulent transactions. Further, it is desirable, especially in the context of terrorism-related AML that the actual lists of: (1) data being analyzed, (2) transactions, and the list of them whose correlation is being monitored, and (3) other information of that sort, be at least in part unknown from all parties so that even coercion on agents and their families and friends would not help the adversaries gain access to information.

Secure Data Processing Unit (SDPU) Overview

Referring to FIG. 1, an exemplary fraud detection system 11 is shown, in this case, utilizing a secure data processing unit (SDPU) 10, also referred to herein as a Type 1 unit. Note that many of the features of fraud detection system 11 are also shared by the embodiments using Type 2 and Type 3 SDPUs described below with reference to FIGS. 2 and 3. Accordingly, a general overview of features common to Type 1, 2 and 3 SDPU's are described with reference to FIG. 1.

As described herein, the term "secure processor" can mean either secure processor or secure co-processor, i.e., the device can either be a full fledge computing device conceive to be used as a stand alone, or must be attached to a computer that needs not have the same level of security. In the case of a secure co-processor, the computing that needs protection is performed inside the secure co-processor, which could either be a programmable device or a build to purpose device.

Fraud detection system 11 includes an interface 16 for inputting analysis requests (or queries) 12. Each request generally includes some transaction data that needs to be analyzed for fraud, e.g., a bank transfer, a withdrawal, an account, a name, etc. Interface 16 also outputs analysis results 14 that may include, e.g., an alert, related data records, a score, etc. It should be recognized that the invention is not limited to any specific input or output format. Interface 16 may utilize any type of system, e.g., a user friendly interface, an API interface, an application layer, etc., which allows requests 12 to be submitted, and analysis results 14 to be obtained back from SDPU 10.

Note that communication with SDPU 10 is strictly controlled and limited by a comprehensive security system 19, which restricts access to both data and program execution. Security system 19 includes, e.g., a secure I/O system 18, a secure tamperproof processor 20, such as the IBM PCI 4758 co-processor or "4758," an encryption system 24, a secure communication channel 23, etc. Thus, SDPU 10 provides a secure execution environment where execution behavior cannot be monitored, a secure memory 21 where programs and other data cannot be read, and a secure communication channel where communications cannot be monitored.

Operation of the fraud detection system 11 is generally as follows. SDPU 10 includes a transaction analysis system 22 that analyzes transactions. Analysis system 22 may include any algorithms, filters, models, etc., which can look at certain transaction details and make some determination regarding the probability that the transaction is fraudulent. As described in more detail below with regard to FIGS. 2 and 3, fraud detection system 11 may also typically include systems for processing stored transaction data to either (1) analyze a current transaction, or (2) to build models and other tools for the analysis system.

Type 1 Embodiment

The first embodiment (Type 1), shown in FIG. 1, addresses the need for providing secrecy to the algorithms and methods being used to identify fraud. If an adversary knows how a surveillance system tracks potentially fraudulent events (e.g., it looks for transactions greater than $1 million), then the adversary can take steps to avoid such behaviors. Thus, secrecy of at least some of the methods and/or algorithms to be used by the transaction analysis system 22 provides a decisive advantage.

To achieve such a solution, SDPU 10 provides a library 28 of encrypted surveillance algorithms that are interchangeably utilized by transaction analysis system 22. It is understood that each "surveillance algorithm" may be implemented in any manner, e.g., as piece of a computer program, as an entire computer program, as a dynamically linked library, etc. Accordingly, the term surveillance algorithm may also be referred to simply as a "surveillance program" within this document. An algorithm selection program 26 is provided to select, at random times according to any specialized or publicly available pseudo-random number generator (for instance the $n^{th}$ time is given by $$t_n = T0 * fx0 * (\pi^n \mod.1)],$$

where T0 is a scaling factor, such as T0=2 hours, x0 is an initial condition, $\pi=3.1415926535\ldots$, and mod.1 designates the modulo 1 operation that takes the fractional part of a number), the initialization (e.g., the choice of x0 being done according to the internal state of the secure processor at first installation), and the time being preferably provided by the secured watch embedded in the secure processor 20, different surveillance algorithms, according to some selection scheme. Any selection scheme can be utilized by algorithm selection mechanism 26. For instance, algorithm selection mechanism 26 can select algorithms in a randomly, round-robin fashion, based on transaction type, etc. Similarly, the frequency with which algorithms are selected can be random, preset, etc.

Moreover, SDPU 10 may include an algorithm performance system 30 that determines, e.g., with feedback, how each algorithm has performed. This information can then be utilized by algorithm selection program 26 in the selection process. However, if the feedback on the quality is made by external agents such as human agents, the risk exists that biases will be imposed which will affect the randomness of the choices: this and any other attack which would bias the random choices of algorithms will be protected against by installing in the secure processor an algorithm to check on the randomness of the choices (by associating an order number M(alg) to each algorithm alg and computing correlation measures such as $$Cor(N,k) = \Sigma_{i=1,\ldots,k} M(alg)N) \cdot M(alg)(N-i),$$

where M(alg)(m) stands for the order number of the algorithm being used after the $m^{th}$ change or entropy measures or other measures of randomness), so that an alert will be emitted and securely delivered to the proper agents (for instance, the machine blocks the system and can only be restarted by an agent equipped with the proper dedicated password) if some correlation or other measurement passes some threshold value. Once selected, encryption system 24 can be used to decrypt the selected algorithm or plurality thereof. Once decrypted, the algorithm or combination thereof can be installed in the transaction analysis system 22. Thus, because algorithms or combinations thereof are regularly (but preferably at random times) changed in a secret and secure environment, an outside observer could not determine the criteria used to analyze transactions for fraud. The secure hardware necessary to achieve this implementation could in particular home lightweight predictive models output by one of the lightweight algorithms for cost-sensitive learning, as described in IBM Technical Report RC22666, and later when further generations of secure hardware become available, implement more and more complex models.

As described above, SDPU 10 includes a library 28 stored in a secure memory 21. It should be noted that secure memory 21 might be implemented as a confidential database that could either belong to a financial institution or to some service provider. Programs or surveillance algorithms signed by trusted parties could be added to the library 28, or the library 28 could be linked to trusted engines that provide new models for fraud detection, or new parameter sets for known models (models with different parameters will be considered as different, and a model may be identified with an algorithm that uses that model to filter events or do any kind of operations to perform some type of fraud detection). One may also prefer to have a fixed set of surveillance programs in the library 28, which changes altogether when the library 28 becomes obsolete. As a library 28 may fail for all sorts of reasons, protocols may be defined to let the secure processor 20 accept new or extra libraries: methods to do so are well known in the field of network security, and some are preferred With some types of secure hardware such as the 4758.

The secure processor 20 may reside, e.g., at a financial institution or at some service provider, which need not be the same entity that owns and/or operates the library 28. Even if the library 28 resides at the financial institution, it may still be owned and/or be operated by a service provider. Moreover, the library 28 may be integrated with existing fraud detection software such as that provided by some independent software vendor (ISV), so that the algorithms in the data processor 20 will preferably be most efficiently complementary to those used by the ISV.

As noted above, algorithm selection mechanism 26 may select algorithms from the library 28 in a random fashion, e.g., using a clock coupled with any pseudo-random number generator. The pseudo-random number generator should preferably remain secret as the performance may depend both on the pseudo-random number generator itself and on how well it is kept secret. Performance analysis system 30 can modify the random times when changes are made (for instance by changing the scaling factor T0 in the example provided previously), or the sort of surveillance programs that are preferably chosen from the collection in the library 28. Changes of libraries may be decided on the same basis. Also, performance analysis could be used to change the surveillance algorithm being used (and possibly to disqualify it and those judged similar to it for all further times) if a drop of performance is observed. Particularly good surveillance algorithms could be utilized more often. It may be the case that drops of performance will be only detected after the fact so that the only action would then be to eliminate the poorly performing programs from the library, or diminish the probability that they be chosen.

However, same time analysis may be performed by comparing the transactions detected by the algorithm in the secure processor 20 to those used as before, and other information from the market at large. Such a comparison is of course approximately convincing as the algorithm in the secure processor 20 is the only one that is expected to be unknown by the fraudsters, but the least sophisticated of them may not be able to know what are the methods used by the financial institution outside of SDPU 10.

Thus, in an exemplary embodiment, at the random times $t_N$, $t_{N+1}$, etc., surveillance algorithms are sent from the library 28 to the secure processor 20 to replace formerly used surveillance algorithms. The surveillance algorithms are either sent in an encrypted form or are sent using some form of secure communication line 23 that may use any security technology such as:

(1) cryptography based with traffic analysis detection if deemed necessary (this would prevent knowing when programs are changed, which is definitely valuable, as a fraudster who has had some operations prevented may want to wait until he/she knows when the surveillance changes); or (2) quantum cryptography, or other form of high security such as one time pad based cryptography.

The form of transfer of a new surveillance algorithm from the library 28 to the data processor may depend on the secure hardware being used as, for instance, present versions of the 4758 are not equipped to accept encrypted programs to be run in their flash memory but may accommodate them in the application layer.

Notice that the functions of the secure processor 20 and the library 28 could be separated into two machines, which would allow a single library to serve several SDPU's 10 operated by several financial institution. Similarly, the library may be dedicated to a single customer, and the processor 20 and library 28 could be physically assembled in a single machine. Also, in a case where several instances of this type of unit 10 belong to the same firm, one of the units (i.e., the central machine) may be more complex and contain the library 28 for all the units of this type. In this case, the central machine would also be able to serve as backup to all related units.

There may also be a single unit of this type in which the library 28 is integrated with the secure processor 20. There could even be a single surveillance program in the SDPU 10, possibly composite, composed by one or more trusted agents of the firm, who may not know whether their program has been selected.

Type 2 Embodiment

The second embodiment, described with reference to FIG. 2, addresses the fact that in order to implement an effective fraud detection system, large data sets are required. To achieve larger data sets, the second embodiment provides a confederated fraud detection system 40 utilizing a type 2 SDPU 42. SDPU 42 includes the same fundamental architecture as the type 1 SDPU 10 described above with respect to FIG. 1. In particular, SDPU 42 includes a security system with secure I/O 46, secure processor 44, secure memory 48, a secure communication channel 68, a transaction analysis system 50, an encryption system, etc.

The type 2 SDPU 42 however includes additional functionality that allows data from a plurality of firms 54 to be consolidated at a consolidated database 52 within the secure memory 48. In particular, SDPU 42 includes a data consolidation system 62 that imports encrypted data 56 from each of the participating firms 54, and then stores the data in the consolidated database 52. SDPU 42 further includes a data analysis toolkit 66 having set of analysis tools, including, e.g., data modeling systems, rules, algorithms, etc. These tools may comprise any system or program for analyzing data in the consolidated database 52. In addition, SDPU 42 includes a rules engine 64 having a set of data access rules that control (i.e., restrict) access to the data. For example, some data may be tagged to disclose only with a proper warrant, or disclose only for data modeling purposes, non-confidential, etc.

Figure 2:
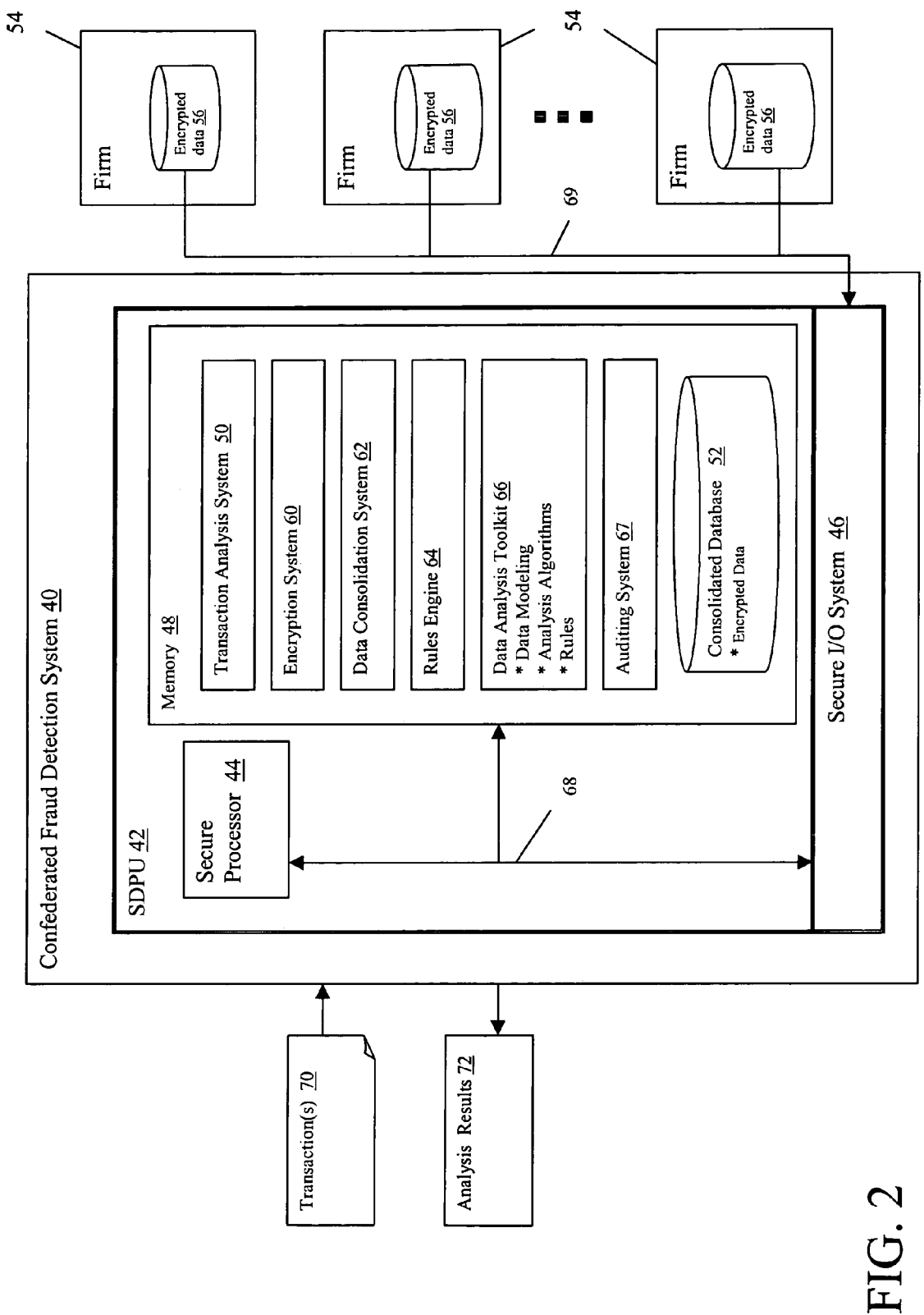
FIG. 2 depicts a confederated fraud detection system in accordance with the present invention.

It should be understood that the term "firm" described in FIG. 2 can be used to describe any type of entity (e.g., line of business "LOB," brands, division, company, etc.) that wants to participate as a member in the data sharing environment provided by confederated fraud detection system 40. The data stored at confederated fraud detection system 40 would typically come from several parties that choose to confederate some of their data (e.g., possibly all credit card data, or all credit card transaction data recognized as fraudulent) but do not want to loose the confidentiality of the data. Analogously to the Type 1 embodiment, Type 2's secure hardware could home some lightweight algorithms for cost-sensitive learning, such as the ones described in IBM Technical Report RC22666, and later when further generations of secure hardware become available, utilize more and more complex algorithms.

The Type 2 embodiment would receive queries from the members of the consortium to analyze data and/or transactions 70 and provide analysis results 72, whenever access to a larger database or correlation of data from a larger set of data sources betters the quality of fraud detection. Such data comparisons or correlation computations could also be done after the fact to improve some of the models, e.g., to develop new filters for instant analysis of data. The tools developed this way can then either be kept in the toolkit 66 or be distributed to the consortium members 54 (e.g., to be used in the corresponding secretive embodiment library or in more traditional tools), or even formalized to be installed like any otherwise defined filters for event analysis to help fraud detection.

While the benefit from consolidating data for larger data set access or enhanced correlation computation capabilities is almost self evidently beneficial to improve fraud detection quality, two simple examples are provided:

Example 1

Check Fraud Prevention

Check fraud has many facets, some of which are harmful mostly to the party accepting the fraudulent check. The banks can be harmed by not recognizing bad checks after they have been deposited, and fraud detection will become even more important with the push toward check truncation, where check images will be kept, but the original destroyed by the banks. Typical examples of frauds that are bad not only to the accepting party but also to the banks are: multiple deposit, change of payee's name, change of amount, use of stolen blank check, use of counterfeited blank checks. Accessing a larger set of data about checks from the same payer obviously increases the chances of detecting a fraud. For instance, this may help detect:

(1) multiple deposits of several unaltered copies of the same check, (2) multiple deposits of several altered copies of the same check, (*)

(3) frauds by change of the payee's name (*)

(4) frauds by change by change of the amount (*)

(5) use of a stolen blank check (detection by signature comparison) (*)

(6) use of counterfeited blank checks (detection by signature comparison) (*)

The lines carrying a (*) are those where access to historical databases about the payer would be helpful if not essential in FD.

Example 2

More Correlation Computations is Better for AML

Money laundering has three main phases:
(1) insertion of money in the financial network,
(2) circulation of money inside the financial network to put some distance, in space, time, and number of operations, between who puts the money into the financial network and that money,
(3) reemergence of the money as legitimate.

In the case of protection against terrorism, the money can be legitimate all along and the goals of the government is twofold:
(1) to prevent the money to come in the wrong hands, and
(2) if money comes to the wrong hands, trace back where the money comes from and recognize if some financial institutions have helped in the process, free-willingly or against their will, by negligence or for a fee or for other motivation.

While tracking money circulation to the wrong hands is rather easy, money circulation has come under intense scrutiny at least since the enactment of the Patriot Act in the US, and similar measures in other countries. Hence, one could expect more and more that bystander accounts will be used (e.g., under constraint on the account owner, or more simply using the complicity of some agents working for the network of financial institutions) to allow money to be transported close to the fields of operations. Such use of bystander accounts, for classical money laundering or for terrorist financing, can only be detected if surges of activity are detected: but the money can be put in some account and taken out through other accounts that belong to or are controlled by the same individual or other entity.

As noted above, the secrecy protecting architecture and methods of the invention may be implemented with data access rules 64 that limit access to confidential data in the consolidated database 52. Namely, using protocols of rules definitions and rules enforcement as well known in the art, and as existing even in some products such as in the line of IBM's Policy Director, security and privacy of data according to any preset and editable (with proper access right) set of rules (with any desired granularity) can be guaranteed in cases where that data needs to be shared between firms 54. In particular, with such use of policy management as well known in the art, the ability to limit the access to specific data elements based on specific data fields or sets can be accomplished. For example, it would be possible to limit access to the data of a specific customer where they have indicated on GLB Act requirements that they do not wish their data shared with certain third parties. In addition, this embodiment also provides the ability to comply with elements the Safeguards Rule under the GAL Act that require the privacy of the data to unauthorized access to be guaranteed.

Below is a description of one possible realization of this embodiment, using as the data analysis algorithm the lightweight cost-sensitive learning algorithm called "wagging" and described in IBM Technical Report RC22666, and using as the secure processor the IBM 4758 PCI Cryptographic Coprocessor.

As a premise, each participating firm 54, e.g., a group of banks, enter in encrypted form a data set 56 of the following form to the consolidated database 52 which is accessible only via the secure processor 44. The data format is such that each record consists of a transaction ID, various attributes of the transaction, and the cost incurred by that transaction. Here the cost is to be non-zero just in case the transaction in question corresponds to a known past fraudulent transaction and the assigned cost is to be a measure of the loss incurred by that fraud. The consolidated data is simply a collection of data in this format collected from multiple banks.

Given the above setup, the cost-sensitive learning algorithm, loaded into secure processor 44, works by iteratively sampling a small subset of the entire, consolidated database 52, and running a generic classification learning algorithm, on the sample so obtained to generate a classifier, and finally outputting a final model defined as the average over the models obtained in the intermediate iterations. Here, in obtaining a small sub-sample in each iteration, the algorithm probabilistically samples from the consolidated database 52, where each record is accepted with probability proportional to its associated cost. The acceptance probability can be calculated, for example, by dividing its cost by the maximum cost associated with any transaction. Given the highly skewed cost functions associated with a fraud detection problem, this method can produce a very small data set in each iteration, which are likely to contain sufficient cases of fraudulent transactions. The small data set is useful in that it can fit into a high-speed memory space (e.g., cache, RAM, etc.) associated with processor 44.

Transaction analysis system 50, along with data analysis tools can provide a real time surveillance function to secretly store (for instance) a final predictive model. When a new transaction ID is presented for surveillance, transaction analysis system 50 first obtains all of its attribute values by retrieving the data record corresponding to the transaction ID from the consolidated database 52, and then applies the predictive model to obtain a prediction of whether the transaction is likely to be a fraud. Based on this output, SDPU 42 can emit an alert to appropriate module(s).

Other model building methods may not be fit into a single, or even in a battery of secure processors or coprocessor. Even some of the models that could not be all performed inside the secure hardware all at once and would require more interaction between the computations done in and out of the secure hardware to deliver filters or the elements to analyze transaction data on the fly that could be operated inside the secure environment. In these cases, secrecy and confidentiality from all parties (except authorities with warrant as will be described below) will be kept using the proper amount or encryption and decryption and connections between the inside and the outside of the secure hardware. An acceptable level of security can therefore be guaranteed by the secure hardware, even if not all of the system is inside the secure hardware environment.

A consortium can be formed to host a confederated fraud detection system 40, using the SDPU 42 secure hardware based architecture, which will protect secrets from whoever builds, owns, or runs the machine. Thus, a service provider that can be one of the firms 54 could host system 40.

Each firm 54 provides the SDPU 42 with one of the following types of data (for instance):
(1) a list of all transactions of some sort such as credit cards, or debit cards, or checks, or credit and debit cards, or any composition of that sort,
(2) the same as above, but only when recognized as fraudulent,
(3) the same as above, but only when recognized as fraudulent or possibly fraudulent and respectively marked as such.

Integration of all such data by data consolidation system 62 may be made difficult by the fact that different firms or parts of firms may have quite heterogeneous data structures or data formats: such difficulties can be handled in an efficient way, that would not hamper the efficiency of the operative part of the SDPU 42 to be described below, thanks to heterogeneous data integration tools such as IBM's DB2II (where II stands for "Information Integrator"). Such tools may also prove handy in the operation of Type 3 Embodiment machines to be discussed below.

The SDPU 42 devices can use any available data in consolidated database 52 to build better models and filters to detect frauds; these models and filters can be used by the transaction analysis system 50, possibly in conjunction with other filters and/or models, possibly for a fee. The term "model" is for instance a statistical model, or a form a clustering or other data mining type model, from which actual algorithms to decide if given events or collections thereof are fraudulent, while a filter is one such algorithm, be it extracted from a model in the sense described herein: indeed the simplest form of a filter is a random sampler which designates at random some events to be scrutinized. In fact, the random sampler can also designate at random, some level of thoroughness that will be used to scrutinize the events: then the outputs of the sampler are of the form: (No inspection) or (To be inspected; at level of thoroughness X), and the thoroughness can be upgraded if suspicion arises during the inspection.

Whatever is sent to the consolidated database 52, secure processor 44 can be controlled by data access rules 64 to analyze some or all transactions, of one or several sorts that need to be performed by some or all of the members. Thus, different firms 54 may have different contracts subjecting them to different access rules.

Type 3 Embodiment

Figure 3:
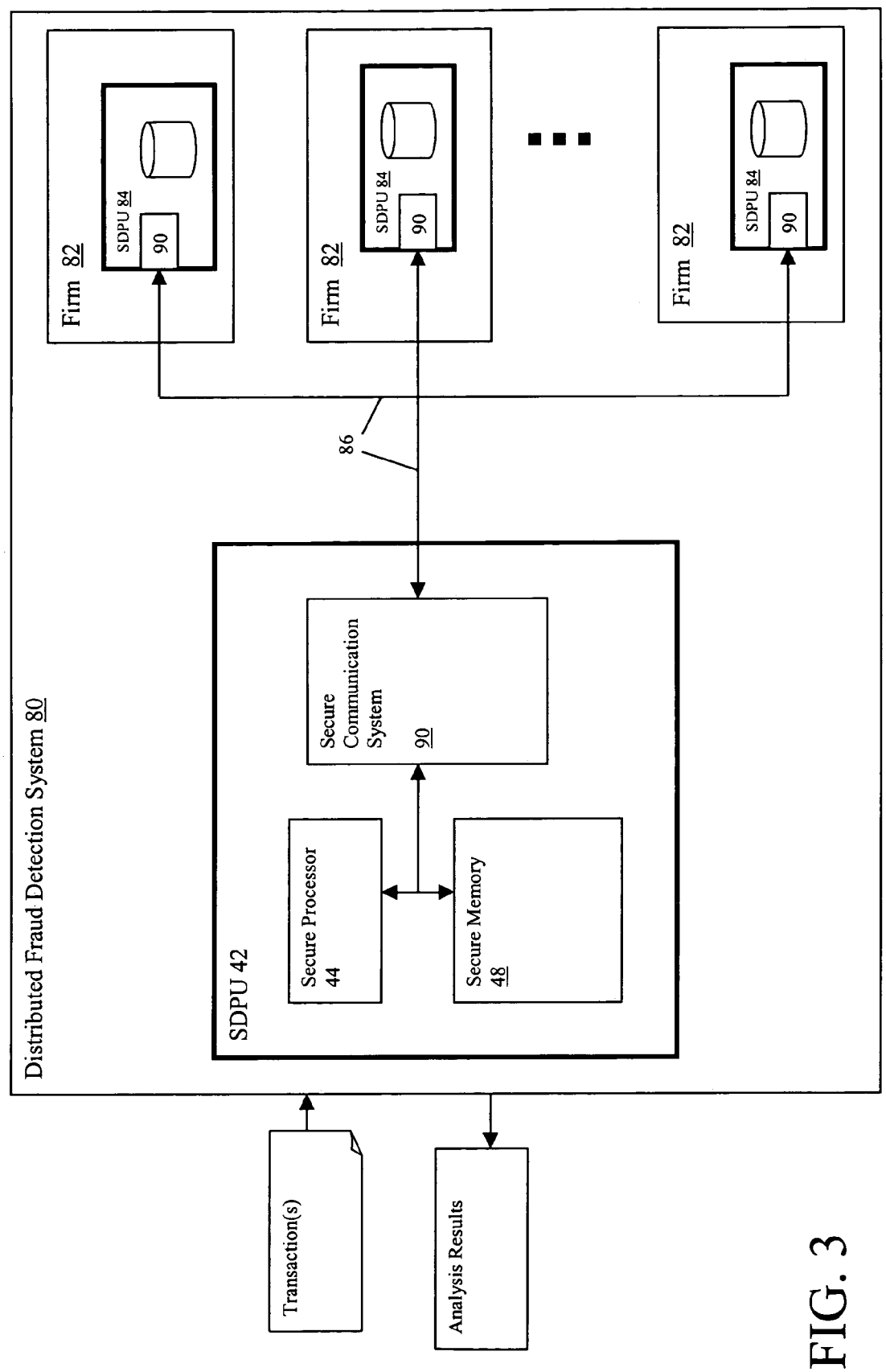
FIG. 3 depicts a distributed fraud detection system in accordance with the present invention.

This embodiment addresses the fact that the data required to implement an effective fraud detection system is typically distributed among multiple firms, and consolidating the data at one location is not always practical or desirable. Accordingly, as depicted in FIG. 3, this embodiment provides an architecture wherein each participating firm 82 has their own secure data processing unit (SDPU) 84. Each SDPU 84 includes a secure communication system 90 that allows each unit 84 to securely communicate with each other via a secure communication network 86, thereby enabling confidential data sharing. Thus, a full collection of data about a customer can be obtained via a distributed network 86. The units 84 of this type may be embodied in or work with the architectures described above with regard to embodiments Type 1 and 2. In this case, a Type 2 unit, SDPU 42, is utilized to provide a central dispatch role.

Thus, for instance, when a member of a consortium (having a type Type 3 unit) needs information about a customer or transaction, the member can send a request throughout the network 86 to obtain information for all or some information about the customer or transaction. A central dispatch, e.g., involving a type 2 unit, may be utilized so that protection against traffic analysis can easily be put in place and to preserve the anonymity of which member of the consortium requested the information. Furthermore, customer accounts can permanently be requested by the Type 3 units, for no reason other than to prevent Information Technology (IT) personnel working to observe which accounts are actually consulted for a purpose other than imitating true traffic. Use of such Type 3 units allow the Type 2 units to keep reasonable size databases rather than to comprise all databases of all participants, something which would neither be practical, nor be acceptable by competing firms.

Confidentiality Protocols

As previously noted, control must be made on the request sent to the Type 1, Type 2, or Type 3 units to make sure that no confidential information is leaked out in an undesirable fashion. This can be achieved by means described in US patent application DATA MANAGEMENT SYSTEM AND METHOD. For instance, one may arrange that all units only accept requests that belong to certain classes whose format and further characteristics (such as the frequency of use) belong to a list that carry the allowed digital signatures of all members (or all founding members, etc.) of the consortium.

The secure hardware can be arranged to guarantee either total secrecy from everyone, or there may be a lower layer that can be accessed only under preset circumstances, typically by several official agents each having a partial authority, which lower layer supports a commercial secret layer set so that no member of any consortium, nor the people that built, maintain, run, administrate in any form, or possesses the modules can access any confidential information.

Because: (1) it is not expected, for both competitive and other commercial reasons as well as for purely technical reasons, that all member firms will consolidate all their data about all their customers, and (2) some frauds, in particular of the money laundering type, can only be detected (except for other forms of intelligence) by observing the financial and even more, the commercial markets at large, machines of Type 3, preferably in conjunction with Type 2 and Type 1 units, can be used to access all data that relate to data filtered by some member to be suspicious. Again, suspicion can be only the product of some random sampling, or of a human intervention, or a flag produced by any form of filter that a firm could use. For instance, a Type 1 or a Type 3 unit (possibly prompted by some other machine or internal software or by one or more human agent or a conjunction of these different factors) could prompt a Type 2 machine with the information that some customer or some transaction involving one or more customers is suspicious.

A "full collection" of data for a customer could include, e.g., (1) all data about the customer over some primary span of time; (2) data about secondary parties that the customer had business with, over some secondary primary span of time; (3) data about ternary parties forming the collection that the secondary parties have had business with, over some secondary span of time; and so on. The data can be gathered in any manner, for instance in a Type 2 machine or in a further, dedicated machine, with the same level of security guaranteed by secure hardware such as the 4758. Then this collection can be confidentially analyzed inside a model build process according to the present invention to detect fraud or suspicious patterns. The amount of data gathered can vary, e.g., it may depend on the level of a primary alert.

If an opinion of suspicion is formed, then the Full Collection can be transferred to a regulatory body. Alternatively, some patterns can for instance be isolated and made anonymous before being assembled in a "Reduced Collection," which is what is to be transferred to some party such as some regulatory body. If the analysis, possibly with some court or other body intervention indeed confirms that further inspection is necessary, a warrant could be delivered that would release the Full Collection, or some collection intermediary between the two for further inspection until eventually one makes a decision about the identities of all or some parties, and about some or all data.

Of course, a variety of protocols could be implemented, the main point being that the basic structure of the invention would allow anonymity to be protected until some case could be built, and then any data releases can be made at the right level and to the rightful parties.

One problem that might arise is that the Type 3 machines could reveal the parties being investigated, just by observing the data being collected and sent to the Type 2 machine. To avoid such traffic and activity analysis, or at least significantly lower its effectiveness, one could use fake traffic and activity.

Protection against frivolous or insufficient requests can be provided by designating to some regulatory body, those firms that provide alarms or requests at a rate statistically abnormal. The regulatory body, or other form of authority in charge would then verify if the statistical abnormality is fortuitous, or if indeed the seemingly abnormal rates of alerts are normal while it is the other firms or other firm components that behave abnormally. The problem once diagnosed should be easy to correct after proper inspection and auditing, which is one of the many reasons why audit trails should be prepared and protected. Protection against frivolous or insufficient requests can also be implemented to avoid clogging the system or loosen the confidence of the system.

It is essential that the release of some information to a legitimate party be made available without comprising the confidentiality of the rest of the data. One way to achieve this result is that all keys remain secret, but the data be sent to a legitimate conglomerate of parties with their own key from the system, without ever revealing more. One could also re-encrypt all other data before delivering the old keys to the authorities, while only the delinquent information would be kept encrypted with the old keys.

Methods of Delivery of the Benefits of FD According to this Invention:

The various aspects of the invention, using any combination of Embodiments Types 1, 2, and 3 machines (using only one type considered as a particular case) can be delivered in many ways. The most classical way would be to implement in house any part of the invention, and if necessary, participate in a confederation. Instead of a confederation, some service offerings that could be made by a Service Provider (SP) to some Business Entity (BE). Examples could include:
  Basic Service:
  A fraud detection service, comprising the steps of
  the BE subscribes to the service from the SP,
  the BE uses the communication protocol and mechanism provided by the SP (possibly using some third party specialized in secure communication) to securely transfer the data to the said service provider (using methods well known in the art, and communicating with the secure hardware components as described above, whenever appropriate),
  the SP maintains data confidentiality for identifying and concealing confidential details of the received data, using the systems previously described,
  the service stores the received data, and stores the confidential details in encrypted form,
  the SP performs fraud detection in full confidentiality with no access of any personnel of said SP, or of other subscribers to the service if any, to confidential or private data.
The Basic Service previously described, wherein the SP employs a system comprising:
  a data decryption system for decrypting received data;
  a data verification system for verifying an accuracy of received data;
  a program approval system for approving systems for analyzing the stored data; and
  a key security system for protecting encryption keys.

The Basic Service previously described, where the subscribers of the service are provided with the option to allow the service to perform analysis or construct models using its data in conjunction with data from other subscribers.

The Basic Service previously described, wherein a secret surveillance service can be provided (for instance using Type 1 units as described previously), where some model or filter provided by the service provider may be used as a library of surveillance programs, which are sometimes changed so that no one knows (nor even can know, except possibly for agents with warrants) what runs in the service provider machine at any time.

The Basic Service previously described, wherein a service is provided for consolidating data, extracting possibly some models or filters from the data so collected, and possibly analyzing events or transactions, or chain of events or transactions, as prompted by the subscribers.

Basic Service with Data Analysis: The Basic Service previously described, wherein stored data from the subscriber is analyzed with a data analysis system.

The Basic Service with Data Analysis, wherein the said data analysis system is permitted to perform specific types of analysis on the stored data based upon approval by subscribers. Such approval that can be controlled by using digital signature, for instance:
  by each subscriber,
  or by a set of senior subscribers which are the only ones that need to sign,
  or by some random set of subscribers that may be selected for each new data analysis program,
  the previous case being conceivable with or without veto right by some or all subscribers.

The Basic Service, wherein the SP employs a data management system which is a tamper resistant (i.e., tamper sensitive, tamper reactive, and tamper evident) and programmable.

The Basic Service, wherein some random data is received or requested by the subscribers of the service, based upon a randomly generated time interval to avoid secrecy to be compromised by traffic observation.

The Basic Service, where a possibly iterative selective sampling method is employed by the service, such as a probabilistic sampling method with acceptance probability proportionate to a measure of fraud cost of the transaction record, by the data analysis algorithm in Part 2 of the invention, so that the data used for analysis in each iteration is small enough to be stored in the memory of the secure processor.

The Basic Service, wherein the service provides the capability of reconstructing networks of activities among many participating subscribers, and helps recognize the suspicious patterns.

A typical FD (or in particular AML) system does not make absolute decisions on fraud, but alerts human agents (and if so designed, provides facilitated access to all data that have lead to the alert, and possibly all data related to the alert). In systems preexisting to the invention, it could have been possible that frauds detected by the machine be routed to a rouge agent in the compliance service (or any service taking care of the alerts) with the complicity of one or more system engineer (or other IT agent). In fact, without this invention, alerts can be canceled by rouge IT agent interventions. Beside the protection of algorithms and data from all IT agents provided by the invention as described before, the invention sometimes randomly alters (anyway, in an non-predictable manner) the compliance agents that Would be called upon by successive alerts. While it would probably be disruptive for a small organization to have too frequent random decisions on who takes care of what, on the basis of an assignment mechanism included in the Type 1, 2, or 3 unit and monitored using a random number generator as well known in the art, the random component of the assignment can easily be made non-predictable but infrequent enough for the security advantage of this option to be provided, with minimal negative impact of efficient work by the compliance or similar service.

In any surveillance system, audit is an important component as it is crucial to be able to verify the absence of mistake and of criminal modification from normal function of the system.

As some random algorithms etc., may be used, it will be essential to keep a log of what methods and parameters are used at each time, together with the list of what is treated at each time, and what has been decided at each time, so that outputs in given circumstance be re-computed the same way. Such a complete audit trail will protect the banks and/or agent taking care of the surveillance system for the banks (the legal responsibility will be defined by legislation and is expected to depend on the country or state) or against complaints or suspicion by the regulatory bodies. All time registrations involved in the audit trail should be made using secure time stamping as is well known in the art of modern system security, and the secure hardware could be used to home the time stamps generations.

The same systems and methods that should be put in place as described above for audit purposes could be used also to test the functionality of a system at build time and verification during life time since the system, using access protection as described previously on the basis of rule defining and rule enforcing mechanisms, and can make sure that computations be done twice with the same algorithm on the same accounts without divulging any of the accounts names (or other locators). Of course, it would be important that the choice of such verification be made at random and in sufficient number. It would also be easy and useful to allow agents from regulatory bodies to initiate random checks without divulging private or confidential data when such divulging is inessential, besides being able to check well-defined examples on the basis of suspicion. Even in the process of inspection of suspicious events under proper warrants, the policy management can easily be tuned so that confidential and private data is revealed during the control process only as needed, so that if evidence can be obtained at some point in time that the event was not fraudulent, no extra data is revealed afterward.

Methods of signature of algorithms being used for any purpose that are well known in the art can be utilized to do part or all of the audit work or audit-like quality control that we have described without the need of explicitly letting know which algorithms are use at any point of time, as often the only thing that is useful is to know that the algorithm that was used at some point in time gave the results that it seems to have given. For instance, assume that at time T0, algorithm Al(T0), with signature sig1(Al(T0)) gave result Res(Al(T0), Event1), with signature sig2(Res(Al(T0), Event1)). One can then ask the system, behind the protection of the secure hardware, to fetch Al(T0) and provide sig1(Al(T0)) to verify that the proper algorithm is used for verification, then sig2(Res (Al(T0), Event1)) as computed again on the computation can be duplicated to verify that all is fine without revealing any element that may unnecessarily compromise any element of security, privacy, or confidentiality.

Secure Hardware

The IBM 4758 PCI Cryptographic Coprocessor (4758) is a programmable, field upgradeable piece of secure hardware that has a general-purpose computational power about equivalent to a personal computer from the early 90's. It performs high-speed cryptographic operations, and provides secure key storage. It is both cryptographically secure and able to detect and protect itself against physical attacks (probe, voltage, temperature, radiation). It is in fact one of the only two devices that are Federal Information Processing Standard (FIPS) 140-1 overall 4 certified (hardware and micro code: certificate #35), the other one coming integrated in IBM 390 mainframes (the IBM CMOS Cryptographic Coprocessor: certificate #40). The 4758 is a popular PCI bus interface for servers, and can serve as device driver for NT, AIX, OS/2, Linux, and OS/390.

Typical use of cryptographic coprocessors such as the 4758 include High Speed, Bulk Cryptography (for instance for digital movies, in-flight entertainment systems, secure databases, confidential video-conferences, telemedicine, telecommuting, etc.) and Security in Non Trusted Environments (for instance for smart card personalization, electronic currency dispensers, electronic benefits transfer, server-based smart card substitutes, home banking, certification authorities, secure database key control, e-postage meters, electronic payments, secret algorithms, secure time stamps, contest winner selection, software usage metering, electronic securities trading, hotel room gaming, etc.).

Machines are automatically initialized, so that no one knows their keys. For that reason, machines usually come in compatible pairs to provide backup. Machines can also be organized in batteries that share a key built on the base key. Such build up of keys on top of each other can also be used to allow access to the effective key to parties, or even collections of parties that all need to have some piece of the key, to access the secrets with proper warrant: key sharing methods well known in cryptography may allow one to access secrets as soon as some sufficiently large group of part-of-key owners get together.

Cryptography

The use of Private key/public key pairs (or SK/PK pairs, public schemes, etc.) as means to encrypt or digitally sign a file or document, of secret encoding keys, and of secure hash functions (such as SHA-1, as fully specified in the Federal Information Processing Standard Publication 180-1) are now well known: a description of these techniques with directions on how to use several of their implementations can be found for instance in "Handbook of applied Cryptography", by Alfred J. Menezes, Paul C. van Oorschot and Scott A. Vanstone, CRC Press, 1997.

A Digital signature scheme is used in the form of a pair of functions, Sign and $Sign^{-1}$ which are inverse of each other, i.e., for a plain text X to be signed, $Sign^{-1}(Sign(X))=X$. The function Sign is kept secret, being known only to some legitimate owner of the signature and his/her agents. The function $Sign^{-1}$ is known publicly, and accessible for instance through the World Wide Web (WWW), through some agency specializing in providing PKI, or given away by the owner of the pair to whoever needs to check the identity of the sender an/or that a message is exactly as the owner intended it to be. Such signature schemes are used to authenticate bit streams (data or programs for instance).

A public encryption scheme comes in the form of a pair of functions Encr and $Encr^{-1}$ which are inverse of each other, i.e., for a plain text X to be signed, $Sign^{-1}(Sign(X))=X$. The function $Encr^{-1}$ is kept secret, being known only to some legitimate owner of the key and his/her agents. The function Encr is known publicly, and accessible for instance through the WWW or through some agency specializing in providing PKI, or given away by the owner of the pair to whoever wants to send the owner a secret message, or keep secret some part of the message. Public encryption schemes are used, as any other encryption schemes, to put messages in forms that cannot be understood by other parties, in particular for transmission on lines that cannot be secured otherwise (often, it is more prudent to assume all lines, except maybe the ones inside secure hardware, are not secure).

For the purpose of this disclosure, a public scheme can mean either public key signature or public key encryption. To implement a public scheme, one can choose the Rivest-Shamir-Adleman (RSA) protocol (there is one for a signature, one for encryption) as a method to generate and use a SK/PK pair in order to allow for public encryption or digital signature: several other methods could also be used. In most cases, any signature scheme, in particular probably secure ones, can be used: protocols that are probably secure under standard assumptions have been proposed, for instance by Gennaro, Halevi, Rabin ("*Secure Hash-and-Sign Signatures Without the Random Oracle*", EUROCRYPT'99, pp. 123-139, Springer LNCS vol. 1592) or Cramer, Shoup ("*Signature schemes based on the Strong RSA Assumption*", Proc. 6th ACM Conf. on Computer and Communications Security, 1999).

In the case when the functions Sign and $\text{Sign}^{-1}$ (or $\text{Encr}^{-1}$ and Encr) are produced according to the RSA protocol, it is preferred to use at least 1024 digits for X and Sign(X) (the formerly often used 512 digits are no more considered as secure). As a message may contain much more information than the length of the keys, several methods can be used, possibly concurrently, as is well known in the art. For instance, one can split the message in several pieces, some or all of which will be signed, or one can compress the information, for instance using a secure hash function, or one can select a subset of the information, etc. Clearly, the protocol that is chosen has to be known publicly if one desires to use public key cryptography. Also notice that even if one wishes to uses the benefits of public key cryptography, it may be useful to also hide secret information in the messages, so that one could recognize that someone has succeeded to break the keys being used. As usual in the art, it is advisable to change the keys being used every so often, depending on the application, and to keep a list of former keys.

Many cryptographic functions will preferably be performed using non-public schemes, such as Triple DES (DES3) for instance, as they are more efficient in terms of computation and time. Such methods, like public key cryptography, are based on mathematical properties such as the difficulty to invert some arithmetic functions. With computers becoming more and more powerful, messages that cannot be decrypted, or signatures that cannot be counterfeited, at some point in time assuming access to the best computers, eventually get vulnerable. In many cases, any break years after usage is irrelevant, but some secrets may be best kept forever: then one can use the old and very well known one-time pad method which may resist breaking forever.

Another important enabler of secure electronic communication is the possibility to exchange secret keys while exchanging only messages that can be understood by third parties. Several protocols have been created to this effect such as Diffie-Hellman.

As mentioned previously in the section about the 4758, key sharing or shared secrets methods that are well known in cryptography to access secrets as soon as some sufficiently large group of part-of-key owners get together if some proper protocol has been set ahead of time. This and other cryptographic methods also may be employed, such as zero knowledge protocols: they are discussed at length in the cryptographic literature (e.g., see "Cryptography, Theory and Practice" by Douglas R. Stinson, *CRC Press*, 1995).

High Volume Computation

It may happen that some computations or data handling is so huge that, it cannot be done in a single secure hardware component such as a 4758 PCI cryptographic coprocessor, but also it cannot be efficiently done using a battery of such machines working in parallel or using other conglomerating architecture. In such a case, one would then use the secure hardware (again a 4758 or a battery of such machines) as a gate keeper to a computing system enclosed in an environment, hereafter referred to as a "secure room" (what appears inside the wall schematized in FIG. 1), secured for instance using:

7/24 video surveillance with a state of the art system that uses methods to defeat injection of fake images in the system (sealed cameras, and generators of random events with encryption in the field of the cameras, where the random events generators can also be controlled by secure hardware such as the 4758: typical random events are numbers that appear on some moving or fixed screens, and the movement of the screens can also be the effective signature of a secret, random or not, sequence of events or data).

7/24 surveillance as for video, but using other fields, such as the electromagnetic field at wavelength different from the visible ones, sound, possibly smell, and in particular all techniques used for motion detection.

All six faces of the approximate cube or parallelepiped that constitute the secure room should be protected, each face being protected either by video etc., as just described or some of them by walls judged as safe and built for instance with the same principles of intrusion detection and reactive systems used to build small devices such as the 4758.

By walls protecting against any possible detection of the electronic signals generated by the machines operating in the secure room, the only signals detectable being those that transfer in and out of the room through the 4758 or other (preferably FIPS level 4) secure hardware. In complement to the nature of the walls, the room should preferably contain emitters of electronic noise that would cover and scramble any electronic noise produced by the machines working inside the secure room.

The messages coming in and out of the room should be controlled using the following principles:

any data should only go to the owner of the data or possible recipients of the data such as authorized regulatory body, any request for analysis should be properly signed depending on the rules pre-established of what validation needs to accompany each form of request: here the field re-programmability of the 4758 is a feature that would be used to enlarge the set of possible request, using proper protocols as anyone versed in the art could define, to enlarge the set of possible requests, results of requests, like data, would only go to the proper party, and all similar functions as described previously assuming that all computations could be done in one secure hardware machine or a battery thereof.

As usual, using the best technologies may be cost prohibitive for some applications and some tradeoff could be possible, for instance replacing some of the technological protection by the good reputation of a service provider. Tradeoffs and various combinations of offerings may easily be devised, that may evolve with time. For instance, a single type 2 machine, one of the most likely to use a lot of computational power, could be used by a lot of financial institutions so that a high level of security would be desirable, but at the same time, the price would be share by all users, either in terms of cost of installation and ownership, or through service engagement billing, according to models, examples of which are discussed above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A fraud detection system for detecting fraudulent transactions, comprising:
   an interface for inputting transaction data and outputting analysis results; and
   a tamper-resistant secure data processing unit (SDPU), wherein the SDPU includes:
      a security system that can restrict access to data and program execution;
      an analysis system for analyzing inputted transactions;
      a plurality of surveillance algorithms stored in an encrypted database wherein the plurality of surveillance algorithms make a determination regarding a probability that inputted transactions are fraudulent; and
      a selection program for selecting at each of a sequence of random times a different surveillance algorithm to be used by the analysis system.

2. The fraud detection system of claim 1, wherein the SDPU further includes an algorithm performance system that assists the selection program in selecting surveillance algorithms.

3. The fraud detection system of claim 1, wherein the selection program includes a random selection program for selecting surveillance algorithms.

4. The fraud detection system of claim 1, wherein the security system includes an encryption system for encrypting and decrypting data.

5. A method for detecting fraudulent transactions, comprising:
   providing an interface for inputting transaction data and receiving analysis results;
   providing a secure data processing unit (SDPU) that provides a secret and tamper-resistant computing environment, wherein the SDPU can restrict access to data and program execution;
   providing a plurality of surveillance algorithms stored in an encrypted database;
   analyzing inputted transactions for fraud with a surveillance algorithm within the SDPU; and
   selecting a different surveillance algorithm from the plurality of surveillance algorithms for analyzing future inputted transactions.

6. The method of claim 5, wherein the step of selecting a different surveillance algorithm utilizes a random selection process.

7. The method of claim 6, comprising the further steps of:
   measuring algorithm performance; and
   using the measured performance in selecting surveillance algorithms.

8. The method of claim 7, comprising the further steps of:
   measuring a randomness of the algorithm selection process using a technique selected from the group consisting of correlation and entropy measures; and
   issuing an alert if the randomness goes under a predetermined threshold.

9. The method of claim 5, wherein the SDPU prevents observation by an outside observer of which surveillance algorithm is selected.

10. The method of claim 5, including the further step of decrypting the selected surveillance algorithm.

* * * * *